(No Model.)

J. S. HOWARD.
SOLUTION FOR REFINING COPPER AND SEPARATING GOLD, &c., FROM COPPER.

No. 305,192. Patented Sept. 16, 1884.

Witnesses,

James S. Howard,
Inventor
By Atty

UNITED STATES PATENT OFFICE.

JAMES S. HOWARD, OF SPRINGFIELD, MASSACHUSETTS, ASSIGNOR TO J. M. ABBOTT, OF WATERBURY, CONNECTICUT.

SOLUTION FOR REFINING COPPER AND SEPARATING GOLD, &c., FROM COPPER.

SPECIFICATION forming part of Letters Patent No. 305,192, dated September 16, 1884.

Application filed November 10, 1883. (No specimens.)

*To all whom it may concern:*

Be it known that I, JAMES S. HOWARD, of Springfield, in the county of Hampton and State of Massachusetts, have invented a new Solution for Refining Copper and Separating Gold and Silver from Copper and Copper and other Ores; and I do hereby declare the following, when taken in connection with accompanying drawings and the letters of reference marked thereon, to be a full, clear, and exact description of the same, and which said drawings constitute part of this specification, and represent, in—

Figure 1:
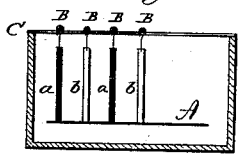
Figure 2:
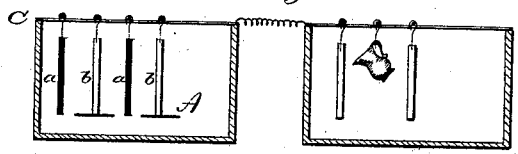
Figure 3:
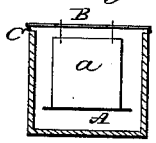

Figure 1, a longitudinal section of the decomposing-tank; Fig. 2, a longitudinal section of the electroplating-tank in connection with the decomposing-tank; Fig. 3, a transverse section of the decomposing-tank.

This invention relates to an improvement in solution to be employed for refining copper and separating gold and silver from copper and copper and other ores, and in the construction of the tank therefor; and the invention consists, principally, in the solution composed of the ingredients and in the proportions substantially as hereinafter set forth.

In making my solution I take twenty-five parts potassium bisulphate, two parts hydrofluoric acid, twenty parts sulphuric acid, three parts of any of the chemicals containing nitrogen—such as nitrate of soda, potash, &c.—and fifty parts water. These ingredients, thoroughly mixed, are heated to about 175° Fahrenheit. The copper or ore is placed in the solution by being suspended or otherwise supported, and a plate of carbon is introduced in connection with each of the copper plates or with the ore, thus forming an electrical battery, which hastens the decomposition of the copper or ore. The gold and silver are precipitated and caught by any suitable receptacle in the tank below. The copper is recovered by the well-known process of precipitation by the use of tin-scrap or any iron, or it may be deposited by the well-known battery process.

As the best means for catching the gold and silver, I arrange a carbon shelf, A, in a horizontal longitudinal plane in the tank below the plates of carbon and copper, and then suspend the plates of carbon $a$ and copper plates or ore $b$ in contact with the carbon plate A. The copper or ore and carbon plates are suspended from copper rods B, across the top of the tank, supported at the edges on copper rods C. A series of these tanks may be arranged and connection made from each to the next, whereby the electric current generated in one may pass onto the next, and facilitate or hasten the decomposition, and finally the last tank may be an electroplating-bath, and the current generated in the preceding tank or tanks employed in place of the battery or other means for generating a current for electroplating purposes usually employed, it being understood that the electroplating-bath is supplied with the common electroplating solution, or with the solution hereinbefore described, and that articles and the metal are suspended therein in substantially the usual manner, and connection made with such articles, whereby the current from the decomposing-bath will operate in the usual manner of electric currents for plating purposes.

Instead of arranging the shelf longitudinally, several carbon plates may be arranged—say one beneath each copper plate or the ore—transversely across the tank.

The proportions for the solution hereinbefore described may be varied to some extent without departing from my invention. I therefore do not wish to be understood as limiting myself to the precise proportions hereinbefore stated.

I claim—

1. The herein-described solution for the decomposition of copper and copper or other ores, consisting of potassium bisulphate, hydrofluoric acid, sulphuric acid, nitrate of soda, and water, in the proportions substantially as described.

2. The combination of a bath provided with the solution hereinbefore described, for the decomposition of copper or ores, with a bath provided with an electroplating solution, and a connection between the articles in the said electroplating-bath and said decomposing-bath, whereby the electric current from the said decomposing-bath may be employed as the electric power for the plating-bath, substantially as described.

JAMES S. HOWARD.

Witnesses:
E. A. TOWNE,
EDWARD F. COLE.